US009632667B2

(12) United States Patent
Huffman et al.

(10) Patent No.: US 9,632,667 B2
(45) Date of Patent: Apr. 25, 2017

(54) MAP LENS IN A USER INTERFACE

(71) Applicant: Hipmunk, Inc., San Francisco, CA (US)

(72) Inventors: Steven Ladd Huffman, San Francisco, CA (US); Carly Lane Plaskett, San Francisco, CA (US); Ryan James Schwers, San Francisco, CA (US)

(73) Assignee: Hipmunk, Inc., San Francisco, CA (US)

( * ) Notice: Subject to any disclaimer, the term of this patent is extended or adjusted under 35 U.S.C. 154(b) by 254 days.

(21) Appl. No.: 14/223,591

(22) Filed: Mar. 24, 2014

(65) Prior Publication Data

US 2014/0298255 A1    Oct. 2, 2014

Related U.S. Application Data

(60) Provisional application No. 61/807,054, filed on Apr. 1, 2013.

(51) Int. Cl.
*G06F 3/048* (2013.01)
*G06F 3/0484* (2013.01)
*G01C 21/36* (2006.01)

(52) U.S. Cl.
CPC ....... *G06F 3/0484* (2013.01); *G01C 21/3682* (2013.01); *G06F 2203/04805* (2013.01)

(58) Field of Classification Search
None
See application file for complete search history.

(56) References Cited

U.S. PATENT DOCUMENTS

| 2006/0139375 | A1* | 6/2006 | Rasmussen | G01C 21/32 345/641 |
| 2010/0094548 | A1* | 4/2010 | Tadman | G01C 21/36 701/533 |

* cited by examiner

*Primary Examiner* — William Trapanese
(74) *Attorney, Agent, or Firm* — Schwegman Lundberg & Woessner, P.A.

(57) ABSTRACT

A map lens may take the form of a shape that may be superimposed on a map displayed in the user interface, moved around the map by the user, and activated by the user to select a region of the map bounded by the map lens. Activation of the map lens may cause the user interface to display only those markers that are within the region bounded by the map lens. In situations where the user moves the map lens over unselected regions of the map, the user interface may dynamically show or hide markers on the map. This may have the effect of presenting to the user a visually uncluttered map in which markers are only shown in the region in which the user has expressed some interest, as indicated by the user moving the map lens to that region of the map.

11 Claims, 22 Drawing Sheets
(15 of 22 Drawing Sheet(s) Filed in Color)

USER INTERFACE SHOWING CURRENTLY SELECTED REGION OF MAP, WITH MAP LENS OVER UNSELECTED EMPTY REGION

USER INTERFACE WITHOUT MAP LENS

USER INTERFACE SHOWING MAP LENS OVER UNSELECTED EMPTY REGION WITHIN MAP

USER INTERFACE SHOWING MAP LENS OVER CURRENTLY SELECTED REGION WITHIN MAP

USER INTERFACE SHOWING MAP LENS OVER CURRENTLY SELECTED REGION OF MAP, WITH CURSOR HOVERING OVER ENLARGED MARKER ("2")

USER INTERFACE SHOWING CURRENTLY SELECTED REGION OF MAP, WITH MAP LENS OVER UNSELECTED EMPTY REGION

USER INTERFACE SHOWING CURRENTLY SELECTED REGION OF MAP, WITH MAP LENS OVER UNSELECTED NON-EMPTY (E.G., POPULATED) REGION

USER INTERFACE SHOWING MAP LENS OVER UNSELECTED REGION, WITH BOX PRESENTING INFORMATION ON REGION BOUNDED BY MAP LENS

USER INTERFACE SHOWING MAP LENS IN MOTION OVER MAP, WITH BOX PRESENTING UPDATED INFORMATION ON REGION BOUNDED BY MAP LENS

USER INTERFACE SHOWING MAP LENS IN MOTION OVER MAP, WITH BOX PRESENTING UPDATED INFORMATION ON REGION BOUNDED BY MAP LENS

USER INTERFACE SHOWING MAP LENS IN MOTION OVER MAP, WITH BOX PRESENTING UPDATED INFORMATION ON REGION BOUNDED BY MAP LENS

USER INTERFACE SHOWING MAP LENS IN MOTION OVER MAP, WITH BOX PRESENTING UPDATED INFORMATION ON REGION BOUNDED BY MAP LENS

USER INTERFACE SHOWING MAP LENS IN MOTION OVER MAP, WITH BOX PRESENTING UPDATED INFORMATION ON REGION BOUNDED BY MAP LENS

USER INTERFACE SHOWING MAP LENS IN MOTION OVER MAP, WITH BOX PRESENTING UPDATED INFORMATION ON REGION BOUNDED BY MAP LENS

USER INTERFACE SHOWING MAP LENS OVER CURRENTLY SELECTED REGION OF MAP, WITH CURSOR HOVERING OVER ENLARGED MARKER ("1")

USER INTERFACE SHOWING MAP LENS OVER CURRENTLY SELECTED REGION OF MAP, WITH POP-UP WINDOW FOR SELECTED MARKER ("1")

US 9,632,667 B2

MAP LENS IN A USER INTERFACE

RELATED APPLICATION

This application claims the priority benefit of U.S. Provisional Patent Application No. 61/807,054, filed Apr. 1, 2013, which is incorporated herein by reference in its entirety.

TECHNICAL FIELD

The subject matter disclosed herein generally relates to the processing of data. Specifically, the present disclosure addresses systems and methods to provide a user interface.

BACKGROUND

A user interface (e.g., a graphical user interface (GUI) to a machine (e.g., computer) may display some or all of a geographical map with various markers to indicate geographical locations within the displayed geographical map. A portion of the geographical map may be displayed within a graphical window (e.g., an application window, a frame of the web page, a pop-up window, or any suitable combination thereof). Such a user interface may allow a user to alter the presented contents of the graphical window by manipulating the geographical map (e.g., zooming in, zooming out, panning left, panning right, panning upwards, or panning downwards). Where one or more geographical locations within the map are indicated by markers within the graphical window, the manipulating of the geographical map may accordingly manipulate the displayed markers. For example, zooming in may cause fewer markers to be displayed in the graphical window, while zooming out may cause more markers to be displayed in the graphical window.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

Some embodiments are illustrated by way of example and not limitation in the figures of the accompanying drawings.

DETAILED DESCRIPTION

Figure 1:
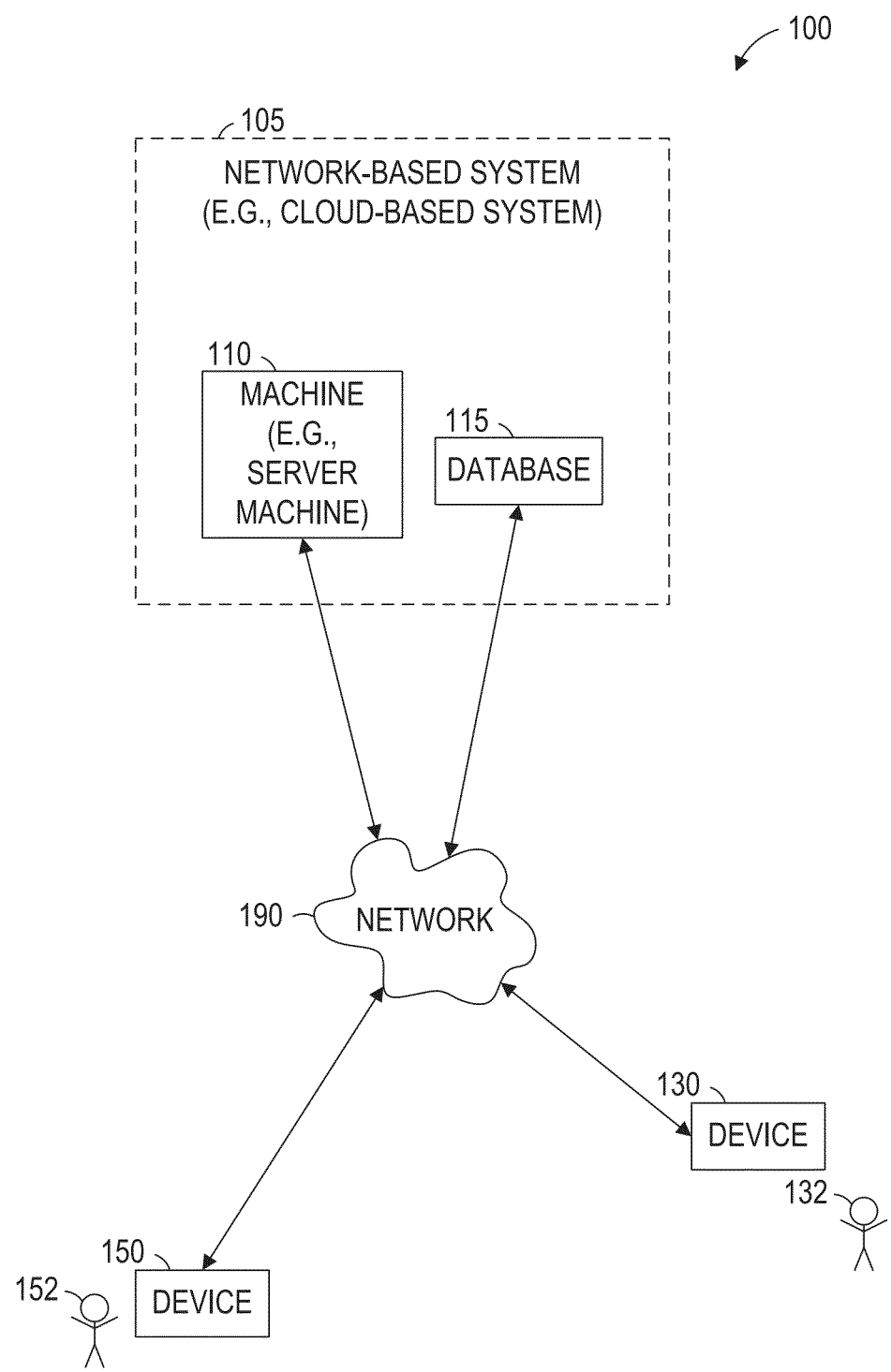
FIG. 1 is a network diagram illustrating a network environment suitable for providing a map lens in a user interface, according to some example embodiments.

Example methods and systems are directed to providing a map lens in a user interface. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A "map lens" is a feature that may be provided as part of the user interface (e.g., as a user-operable element of the user interface). The map lens may take the form of a shape (e.g., a circle or a hexagon) that may be superimposed on a map (e.g., geographical map) displayed in the user interface, moved around the map by the user (e.g., according to cursor movement), and activated by the user to select a region of the map bounded by the map lens (e.g., bounded by the shape of the map lens). For example, the user interface may display the map and allow the user to move the map lens, instead of a cursor, around the map. A user input (e.g., a click of a mouse, or a press of a key) may indicate selection of the region of the map currently bounded by the map lens, and the user interface may stop moving the map lens and instead displaying movable cursor that allows the user to indicate one or more locations on the map (e.g., inside the map lens, outside the map lens, or both). According to some example embodiments, the user interface displays the movable cursor within the currently selected region of the map, but if the cursor is moved by the user outside this currently selected region, an additional map lens is shown to indicate that a different region the map may be selected next.

In some example embodiments, the shape of the map lens is static (e.g., a circle of constant radius). In such cases, the shape may be independent of the level of zoom at which the map is displayed. In alternative example embodiments, the shape of the map lens is dynamic (e.g., changes linearly or non-linearly with zooming, or changes its boundaries as the map lens is moved over the map). For example, the boundaries of the shape may be automatically determined based on features (e.g., landmarks, streets, or topographical indicators) displayed in the map. In some example embodiments, a dynamic shape of the map lens is an irregular polygon that is automatically determined by setting its boundaries to match major features of the map (e.g., freeways, coastlines, waterways, city borders, postal code borders, boulevards having at least a minimum number of lanes, or roads having at least a minimum level of traffic). In some example embodiments, the map lens is presented transparently within the user interface (e.g., with the appearance of a normal cursor, without visible boundaries of the map lens, without visible shading within the map lens, or both). In such example embodiments, however, one or more functions of the map lens may operate similarly to the features described below.

With or without a map lens superimposed, a map may be displayed with one or more markers that indicate locations (e.g., geographic locations) on the map. In some example embodiments, activation of the map lens (e.g., causing the user interface to enter a "lens-mode") causes the user interface to display only those markers that are within the region bounded by the map lens. Some example embodiments enable the user to select the current region bounded by the map lens, in which case, the user interface may omit all markers except those markers within the currently selected region, those markers within an unselected region bounded by the map lens, or both. In situations where the user is moving the map lens over unselected regions of the map, the user interface may dynamically show or hide markers on the map. This may have the effect of presenting to the user a visually uncluttered map in which markers are only shown in the region in which the user has expressed some interest, as indicated by the user moving the map lens to that region of the map. Accordingly, the map lens may function as a user-friendly, visually intuitive, visually clean, easily learned, convenient, and efficient tool for discovering locations indicated by markers, as well as concentrations and placements thereof, within the map displayed in the user interface.

In addition, some example embodiments of the user interface may display an information box that presents additional information about one or more of the markers contained within a region (e.g., currently selected or unselected) bounded by the map lens. In situations where the user is moving the map lens over unselected regions of the map, the information box may be updated as the user moves the map lens around the map. This may have the effect of presenting to the user only that information which is relevant to the markers in the region in which the user has expressed some interest, as indicated by the user moving the map lens to that region of the map. Accordingly, the combination of the map lens and the information box may function as a user-friendly, visually intuitive, visually clean, easily learned, convenient, and efficient tool for filtering out undesired information and quickly finding information about locations within a particular region of the map.

FIG. 1 is a network diagram illustrating a network environment 100 suitable for providing a map lens in a user interface, according to some example embodiments. The network environment 100 includes a machine 110 (e.g., a user interface machine), a database 115, and devices 130 and 150, all communicatively coupled to each other via a network 190. The machine 110 and the devices 130 and 150 may each be implemented in a computer system, in whole or in part, as described below with respect to FIG. 22.

The machine 110, with or without the database 115, may form all or part of a network-based system 105, which may be a cloud-based system. For example, the network-based system 105 may be a cloud-based server system that provides one or more network-based services (e.g., information services, such as a travel shopping service) to the devices 130 and 150.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 22. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
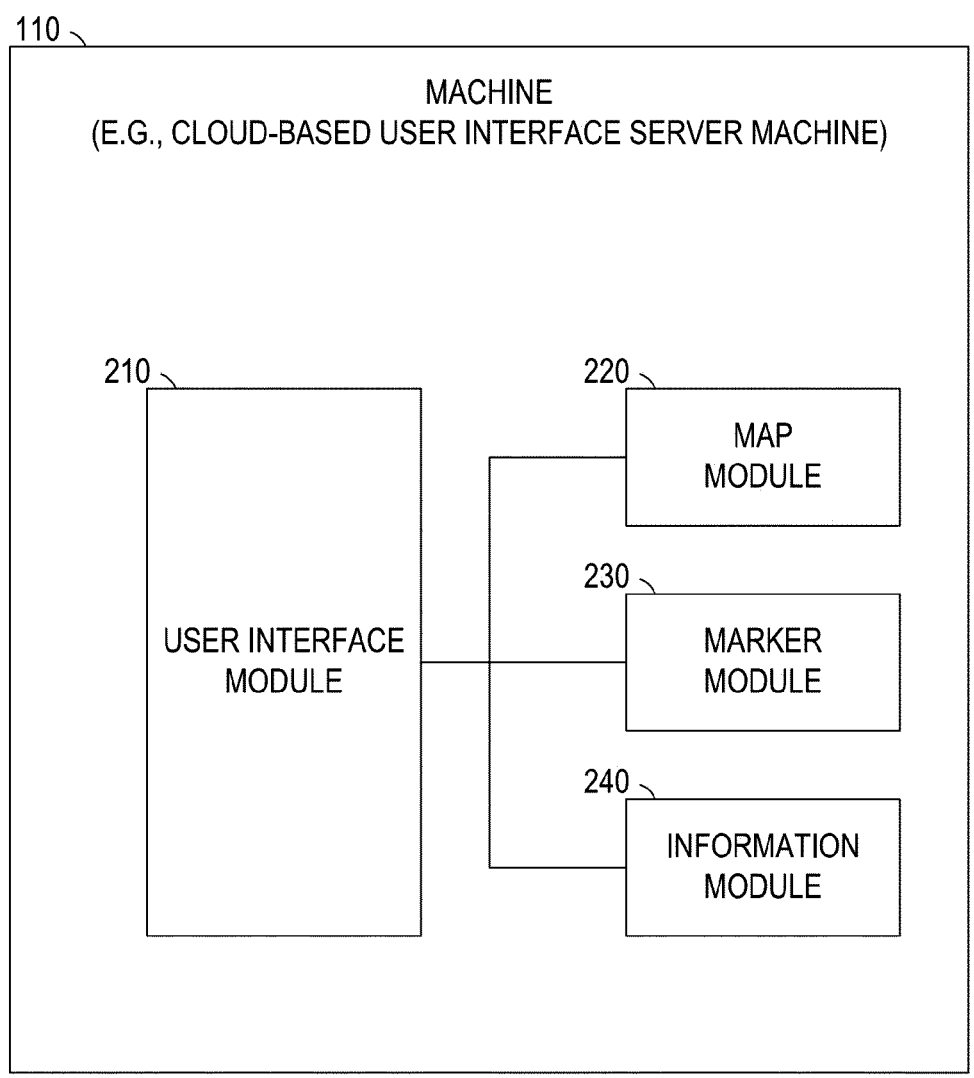
FIG. 2 is a block diagram illustrating components of a machine suitable for providing a map lens in a user interface, according to some example embodiments.

FIG. 2 is a block diagram illustrating components of the machine 110, which may be configured to provide a map lens in a user interface, according to some example embodiments. The machine 110 is shown as including a user interface module 210, a map module 220, a marker module 230, and an information module 240, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The user interface module 210 may be configured to provide a map lens within the user interface. For example, such provision of the map lens within the user interface may be performed by generating a user interface with a map lens, updating a user interface with a map lens, communicating a user interface with a map lens (e.g., to the device 130), or otherwise causing the user interface to display a map lens (e.g., via the device 130).

The user interface module 210 may additionally provide a user interface element (e.g., information box, a pop-up window, or both) that presents information on one or more markers included (e.g., encompassed) within a region of a map, where the region is bounded by a map lens. For example, the map lens may take the form of a semitransparent circle that is superimposed (e.g., overlaid) on a geographical map that is displayed within the user interface. In such a case, the user interface module 210 may cause the user interface to display a box (e.g., an information box) to present information about markers within the circle.

According to various example embodiments, the user interface module 210 provides (e.g., generates or updates) a user interface as depicted in any of FIG. 3-17. Such providing of the user interface may be performed based on information received from the map module 220, the marker module 230, the information module 240, or any suitable combination thereof. The user interface module 210 may receive and process user input to manipulate the map lens. Such user input may be received in the form of cursor input that specifies motion (e.g., moving or hovering), activation (e.g., a click, a touch, or a button press), or both. Based on such user input, the user interface module 210 may cause the user interface to appear as illustrated in any of FIGS. 3-17.

The map module 220 may be configured to provide one or more geographical maps, in whole or in part, to the user interface module 210. The map module 220 may access (e.g., read, request, retrieve, or obtain) such geographical maps from the database 115 or other data repository that stores geographical maps. A geographical map may take the form of a two-dimensional image (e.g., an image file), a three-dimensional model (e.g., a model file), or any suitable combination thereof (e.g., a three-dimensional terrain model textured with two-dimensional satellite images).

The marker module 230 may be configured to provide one or more markers to the user interface module 210. The provided markers may indicate geographical locations (e.g., within a geographical map provided by the map module 220). The marker module 230 may access such markers from the database 115 or other data repository that stores information defining such markers. A marker may take the form of a data record that correlates (e.g., establishes a correlation relationship or an assignment relationship) between a geographical location (e.g., a street address or global positioning system (GPS) coordinates) and information about that geographical location. For example, a marker may correlate (e.g., by reference or by inclusion) the street address with a description of a building (e.g., a hotel or other accommodation) located at that street address. As another example, a marker may correlate a set of GPS coordinates with a corresponding title or label (e.g., "El Capitan" or "Scenic Lookout").

The information module 240 may be configured to access (e.g., read, request, retrieve, or obtain) information about one or more geographical locations identified by markers provided by the marker module 230, and provide such information to the user interface module 210. Such information may be accessed from the database 115 or other data repository that stores such information. For example, a marker may indicate geographical location of a hotel within a city, and information module 240 may access a description (e.g., a review) of the hotel. In such an example, the description of the hotel may include an average rating for the hotel (e.g., four out of five stars), a price per night (e.g., a minimum price, an average price, or both), a demographic group to which the hotel caters (e.g., "family," "business," "romance," "LGBT," or "adventure") or any suitable combination thereof.

Figure 3:
FIG. 3 is a screenshot that illustrates a user interface displaying a map without a map lens, according to some example embodiments.

FIG. 3 is a screenshot that illustrates a user interface displaying a map (e.g., geographical map) without a map lens, according to some example embodiments. The user interface shows markers overlaid on the map. Some of the markers may be non-enumerated and shown as non-enumerated dots (e.g., each representing an individual marker that, in turn, indicates the geographical location within the map). As shown, such non-enumerated dots may be shown in a single color (e.g., small blue dots), although alternative example embodiments may present such dots in multiple colors. In addition, enumerated markers may be shown as number-designated or letter-designated flags (e.g., in the shape of flags, pins, or balloons). As illustrated, such enumerated markers may take the form of numbered blue balloons. A list of description summaries appears at the left side of the user interface. The description summaries in the list respectively correspond to some or all of the markers (e.g., just the enumerated markers). The user interface may enable the user 132 to activate a "lens-mode" and thereby initiate presentation of a map lens. Activation of such a lens-mode may be triggered by a user input (e.g., clicking on a toggle button within the user interface).

Figure 4:
FIG. 4 is a screenshot that illustrates the user interface showing a map lens over an unselected empty region within the map, according to some example embodiments.

FIG. 4 is a screenshot that illustrates the user interface showing a map lens over an unselected and empty region within the map, according to some example embodiments. The map lens may take the form of a shape (e.g., a circle) that is transparent, semitransparent, or opaque. The region bounded by the shape of the map lens is illustrated as being unselected, which may be indicated by the map lens having a particular color (e.g., semitransparent gray). The region is also illustrated as being empty (e.g., containing no markers). The list of description summary still appears at the left side of the user interface. The user interface may enable the user 132 to submit a user input (e.g., cursor input) for moving the map lens elsewhere within the user interface, select the region bounded by the map lens, or both.

Figure 5:
FIG. 5 is a screenshot that illustrates the user interface showing the map lens over a currently selected region within the map, with a cursor hovering over a default position within the currently selected region, according to some example embodiments.

FIG. 5 is a screenshot that illustrates the user interface showing the map lens over a currently selected region within the map, with a cursor hovering over a default position within the currently selected region, according some example embodiments. The region bounded by the shape (e.g., circular) of the map lens is illustrated as being selected (e.g., by the user 132), which may be indicated by the map lens having a distinct color (e.g., semitransparent blue). The region is also illustrated as containing one or more markers. As illustrated, these markers include non-enumerated markers (e.g., small blue dots) and enumerated markers (e.g., numbered balloons). The list of description summaries on the left side of the user interface has been updated to present information on some or all of the individual markers in the region (e.g., just the enumerated markers, or just the top ten enumerated markers, as ranked by rating, price, demographic category, or any suitable combination thereof). The user interface also includes an information box that presents aggregated information (e.g., ratings, prices, or demographics) on some or all of the markers encompassed by the currently selected region within the map. FIG. 5 also shows a cursor (e.g., in the shape of a hand) hovering over a default position (e.g., the center of the currently selected region). In some example embodiments, the user interface may place the cursor at its default position in response to the selection of the currently selected region.

Figure 6:
FIG. 6 is a screenshot that illustrates the user interface showing the map lens over a currently selected region of the map, with the cursor hovering over an enlarged marker within the currently selected region, according to some example embodiments.

FIG. 6 is a screenshot that illustrates the user interface showing the map lens over the currently selected region of the map, with the cursor hovering over an enlarged marker within the currently selected region, according to some example embodiments. The region bounded by the map lens is illustrated as being selected (e.g., colored semitransparent blue). Since this region is selected and the cursor (e.g., in the shape of a hand) is within the region, the map lens has stopped moving over the map within the user interface, and user input (e.g., cursor input) enables the user 132 to hover the cursor over one or more markers contained in the region (e.g., a marker labeled as "2"). As illustrated, the enumerated marker over which the cursor hovers is enlarged in size (e.g., a blue balloon that is bigger than its neighboring blue balloons), which may indicate that the enlarged marker is available for selecting (e.g., to obtain additional information on that enlarged marker). The list of description summaries on the left side of the user interface continues to present the information on some or all of the individual markers (e.g., as updated in FIG. 5). The information box continues to present aggregated information on the markers within the currently selected region of the map.

Figure 7:
FIG. 7 is a screenshot that illustrates the user interface showing the currently selected region of the map, with the map lens hovering over an unselected empty region of the map, according to some example embodiments.

FIG. 7 is a screenshot that illustrates the user interface showing the currently selected region of the map, with the map lens hovering over an unselected empty region of the map, according to some example embodiments. The currently selected region is indicated by the distinct color (e.g., semitransparent blue) applied to the region when the region was selected (e.g., as shown in FIG. 5). As previously noted, the currently selected region is shown as containing markers (e.g., non-enumerated markers and enumerated markers). Based on user input (e.g., cursor input), however, the user interface shows the map lens over an unselected region within the map, which may indicate that another region (e.g., bounded by the shape of the map lens) is available for selection (e.g., with a corresponding deselection of the currently selected region). In the example shown, the map lens is over an empty region (e.g., over water and containing no markers). The list of description summaries on the left side of the user interface continues to present the information on the enumerated markers (e.g., as updated in FIG. 5) individually. The information box previously shown in FIG. 6, however, has been omitted from the user interface (e.g., in response to the map lens moving over an empty region that is devoid of markers).

Figure 8:
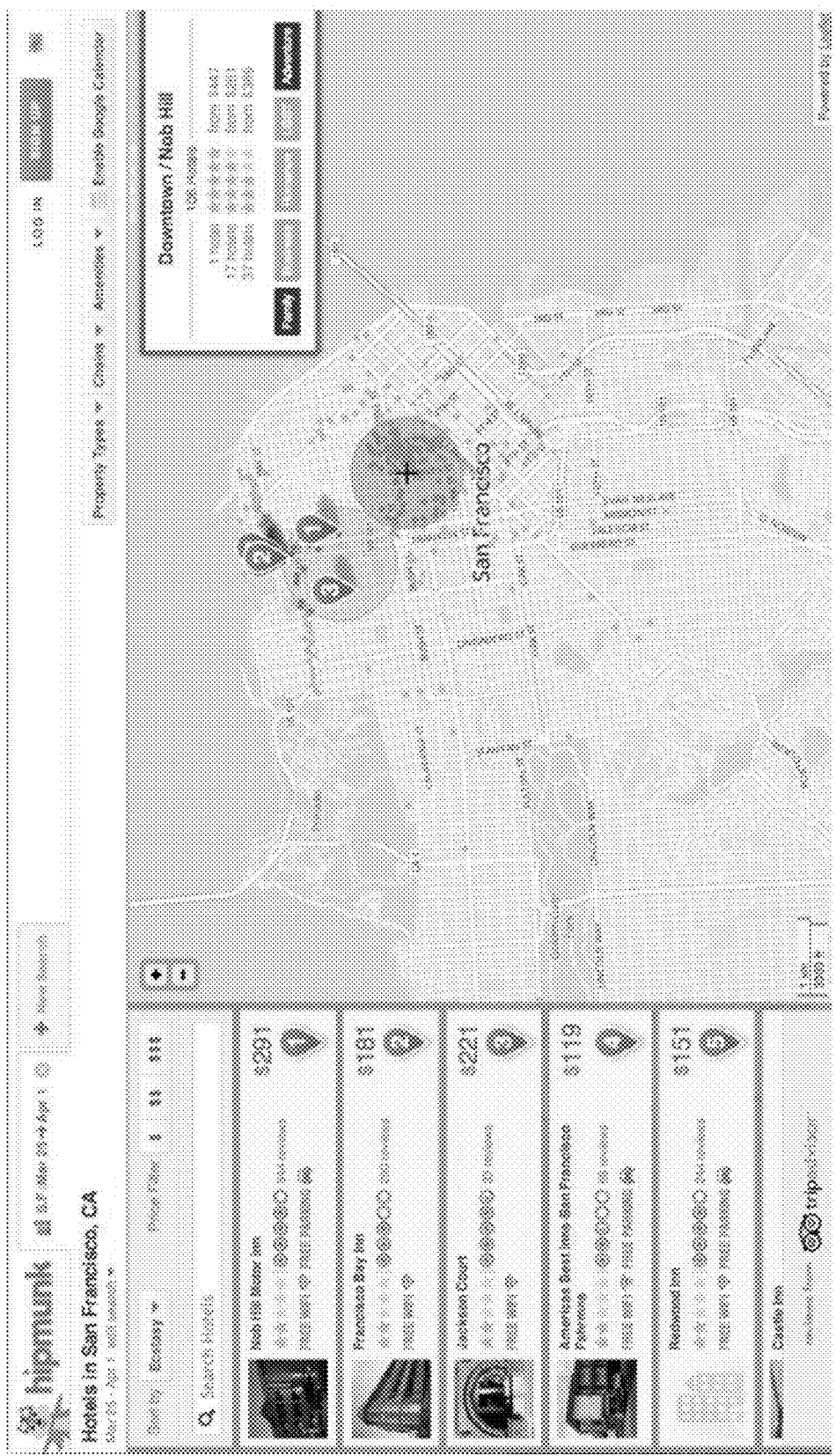
FIG. 8 is a screenshot that illustrates the user interface showing the currently selected region of the map, with the map lens hovering over an unselected non-empty region of the map (e.g., a region populated by at least one marker), according to some example embodiments.
Figure 9:
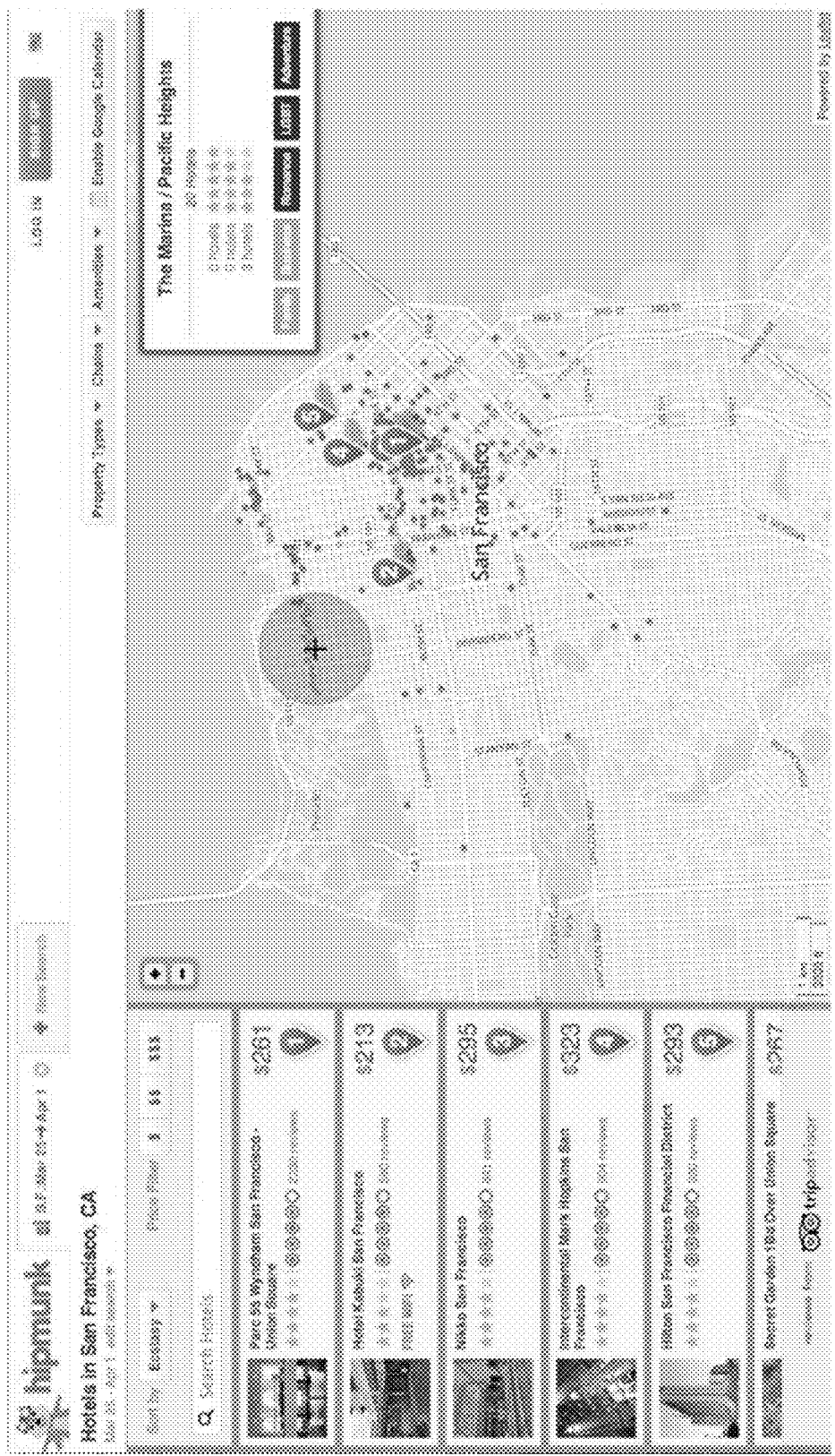
FIGS. 9-15 are screenshots that illustrate the user interface showing the map lens in motion over unselected regions of the map, with a box presenting automatically updated information on the current unselected region bounded by the map lens, according to some example embodiments.
Figure 10:
Figure 11:
Figure 12:
Figure 13:
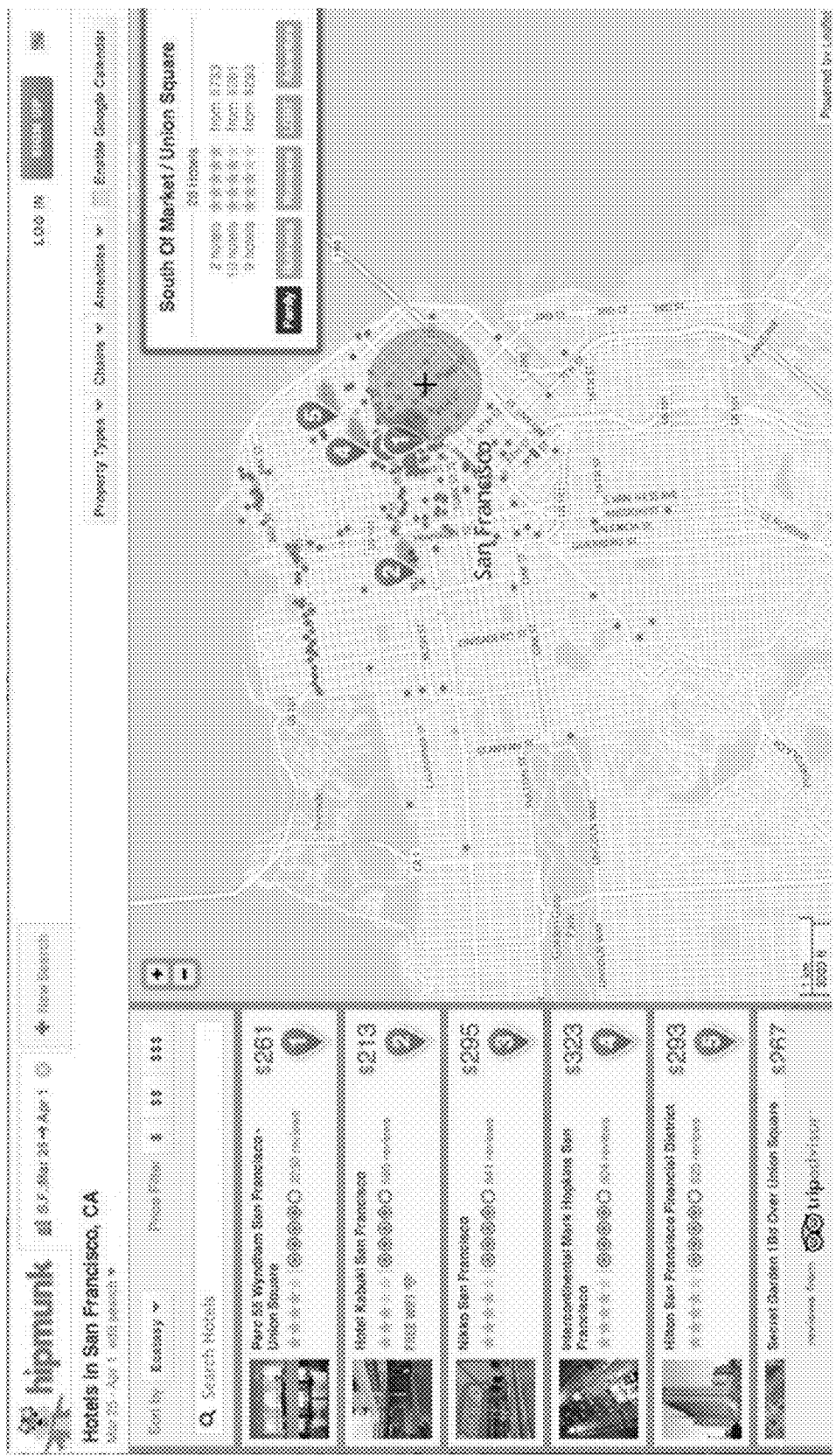
Figure 14:
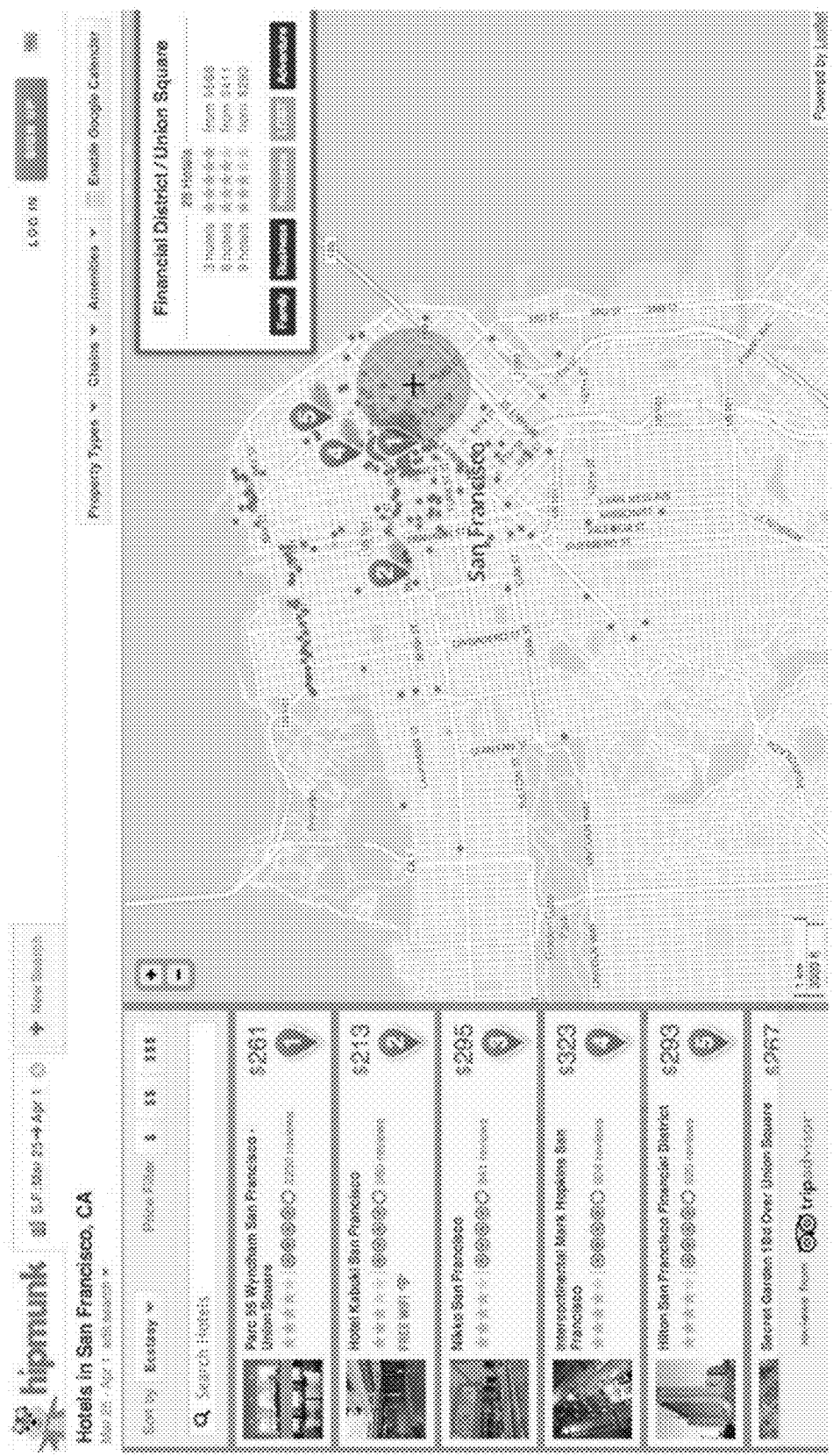
Figure 15:
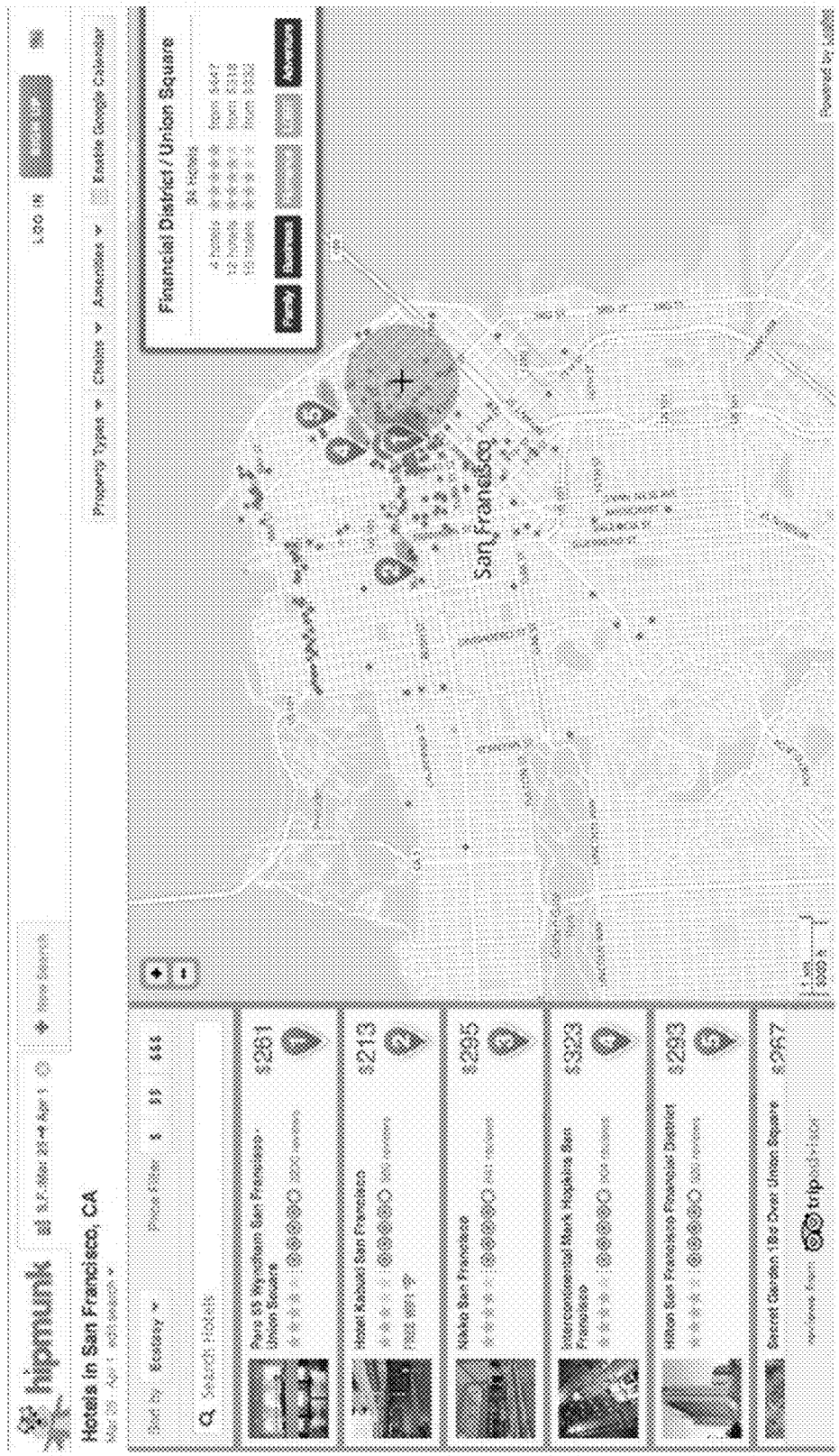

FIG. 8 is a screenshot that illustrates the user interface showing a currently selected region of the map, with the map lens hovering over an unselected non-empty region of the map (e.g., a region populated by at least one marker), according to some example embodiments. As before, the currently selected region is indicated by a distinct color (e.g., semitransparent blue) and is shown as containing markers (e.g., non-enumerated and enumerated). Based on user input, though, the user interface shows a map lens over an unselected region within the map, which may be indicated by a particular color (e.g., semitransparent gray), thus indicating a further region (e.g., bounded by the map lens) is available for selection (e.g., with a corresponding deselection of the currently selected region). In the example shown, the map lens is over a non-empty region (e.g., a region populated with several markers). The list of description summaries on the left side of the user interface presents information on some or all of the individual markers shown in the currently selected region of the map (e.g., just the enumerated markers).

Moreover, the user interface displays an information box. In some example embodiments, the information box presents aggregated information about some or all of the markers (e.g., only the enumerated markers, or only the top five enumerated markers, as ranked by rating, price, demographic group, or any suitable combination thereof) that are contained within the unselected non-empty region of the map (e.g., the region available for selection). In other example embodiments, the information box presents information about some or all of the markers (e.g., only the enumerated markers) that are contained within the currently selected region.

FIGS. 9-15 are screenshots that illustrate the user interface showing the map lens in motion over unselected regions of the map, with an information box presenting automatically updated information on the current unselected region bounded by the map lens, according to some example embodiments. FIGS. 9-15 may be viewed sequentially as illustrating a path taken by the map lens (e.g., under control of the user 132) across the displayed map. In FIGS. 9-15, there is no currently selected region of the map, and the user interface displays markers on a map without regard for any selection of any particular region. Depending on various example embodiments, the displayed markers may include enumerated markers (e.g., numbered blue balloons), non-enumerated markers (e.g., small blue dots), or both.

As shown in FIGS. 9-15, based on the map lens being positioned over an unselected region of the map, those markers within the unselected region (e.g., bounded by the map lens) may be displayed with a distinctive appearance (e.g., small orange dots or squares). For example, the distinctive appearance may be applied to these markers within the unselected region to indicate that these markers lie within the unselected region, to indicate that the information box presents information about only these markers, or both.

In response to a boundary of the map lens being moved over a marker to include the marker within the region bounded by the map lens, the user interface may change the appearance of the marker from its default appearance (e.g., a small blue dot) to the distinctive appearance (e.g., a small orange dot). In response to a boundary of the map lens being moved over a marker to exclude the marker from the region bounded by the map lens, the user interface may change the appearance of the marker from the distinctive appearance (e.g., a small orange dot) to the default appearance of the marker (e.g., a small blue dot).

In response to one or more markers entering or leaving the region bounded by the map lens, as the user 132 moves the map lens over the map, the user interface may update the information box to present aggregated information about those markers contained in the region bounded by the map lens. As shown in FIGS. 9-15, the information box may update information such as one or more neighborhood names (e.g., "The Marina/Pacific Heights," "Russian Hill/Nob Hill," "South of Market/Downtown," "South of Market/Union Square," or "Financial District/Union Square"), a number of markers (e.g., a number of buildings, such as hotels) included in the region under the map lens, ratings for the markers (e.g., individual or aggregated hotel ratings), prices for the markers (e.g., minimum or average prices per night for hotel stays), demographic groups for the markers (e.g., "family," "business," "romance," "LGBT," or "adventure"), or any suitable combination thereof.

In some example embodiments, the information box is a user interface element that enables the user 132 to select one or more demographic groups for the markers. In response to such a selection, the user interface updates the information box with the number of markers that match at least one selected demographic group, as well as ratings and prices for those matching markers. In certain example embodiments, selection of one or more demographic groups also omits non-matching markers from being displayed within the region bounded by the map lens, within the remainder of the displayed map, or both.

As illustrated in FIGS. 9-15, a list of description summaries on the left side of the user interface presents information on some or all of the individual markers shown in the user interface (e.g., just the enumerated markers or just the top ten enumerated markers, as ranked by rating, price, demographic category, or any suitable combination thereof). In the example embodiment shown, the user interface does not update this list as the map lens moves over various unselected regions of the map, because no particular region of the map is selected and the user interface is configured to update this list in response to selection of a particular region of the map.

Figure 16:
FIG. 16 is a screenshot that illustrates the user interface showing the map lens over a currently selected region of the map, with a cursor hovering over an enlarged marker within the currently selected region, according to some example embodiments.

FIG. 16 is a screenshot that illustrates the user interface showing the map lens over a currently selected region of the map, with a cursor hovering over an enlarged marker within the currently selected region, according to some example embodiments. This is similar to the situation described above with respect to FIG. 6. The region bounded by the map lens is illustrated as being selected (e.g., colored semitransparent blue). Since this region is selected and the cursor (e.g., in the shape of a hand) is within the region, the map lens is stationary over the map within the user interface, and user input (e.g., cursor input) enables the user 132 to hover the cursor over one or more markers shown in the region (e.g., a marker labeled as "1"). As illustrated, the enumerated marker over which the cursor hovers is enlarged in size (e.g., a blue balloon that is bigger than its neighboring blue balloons), which may indicate that the enlarged marker is available for selecting (e.g., to obtain additional information about that enlarged marker). The list of description summaries on the left side of the user interface has been updated by the user interface to present information on some or all of the individual markers within the currently selected region (e.g., just the enumerated markers, or the top ten markers regardless of enumeration). The user interface also shows an information box to present aggregated information on the markers within the currently selected region of the map.

Figure 17:
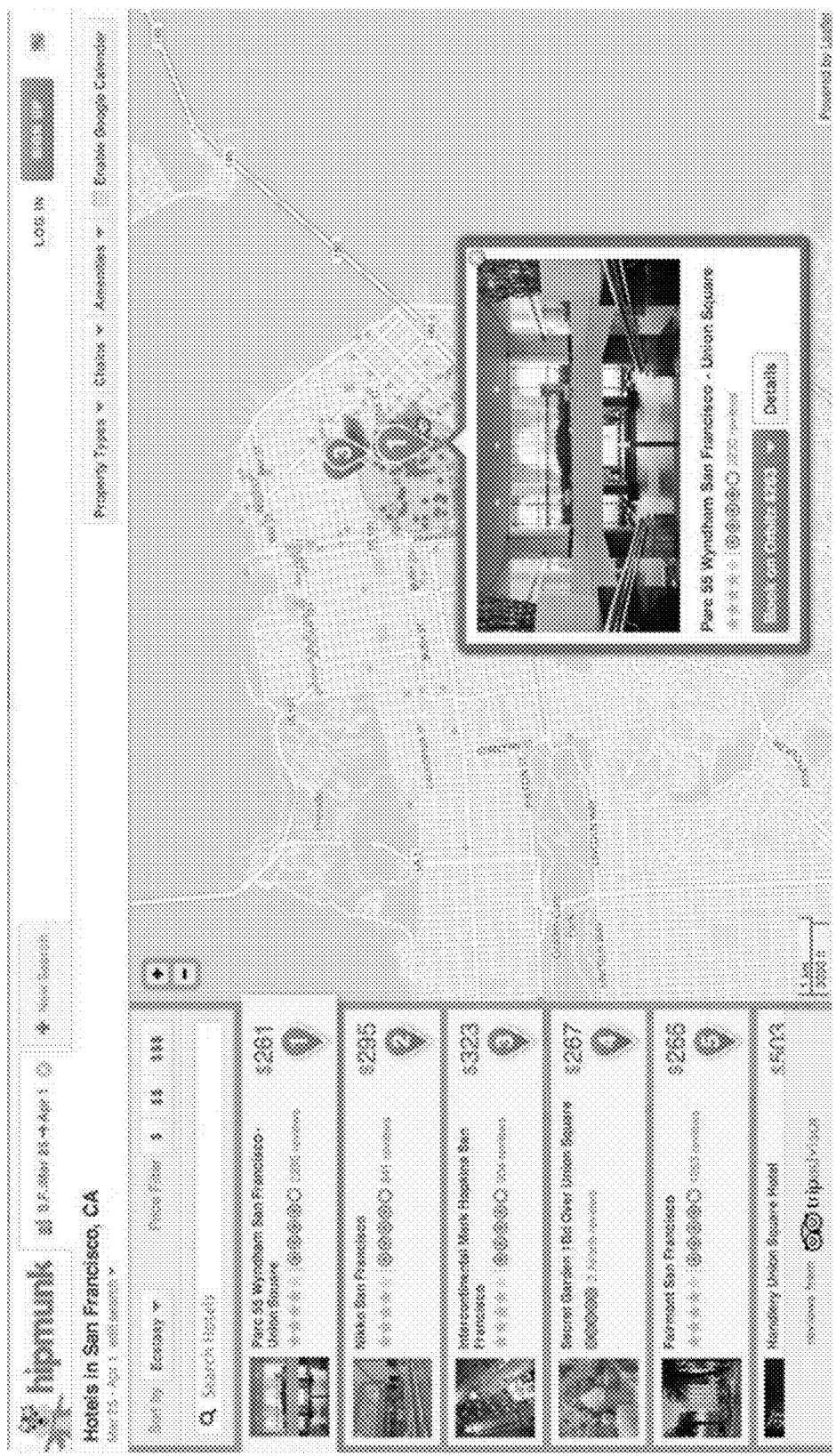
FIG. 17 is a screenshot that illustrates the user interface showing the map lens over the currently selected region of the map, with the cursor over a currently selected marker and with a pop-up window presenting information on the currently selected marker, according to some example embodiments.

FIG. 17 is a screenshot that illustrates the user interface showing the map lens over the currently selected region of the map, with the cursor over a currently selected marker and with a pop-up window presenting information on the currently selected marker, according to some example embodiments. This situation may arise where the user 132 has used a touch or a click to select the enumerated marker over which the cursor hovered in FIG. 16. In response to this marker being selected, the user interface may display a pop-up window that presents information on the currently selected marker. The pop-up window is shown as presenting information such as a title of the marker (e.g., "Parc 55 Wyndham San Francisco"), a neighborhood name for the marker (e.g., "Union Square"), an image for the marker (e.g., a photograph from a hotel at the location indicated by the marker), a rating for the marker (e.g., four out of five stars), a number of reviews for the marker (e.g., 2230 reviews), a price for the marker (e.g., "$263"), a link to an electronic storefront from which the user 132 may make a purchase or reservation that references the marker (e.g., "Book on Orbitz"), and a control that is operable by the user 132 to display additional information for the marker (e.g., "Details" button).

The list of description summaries on the left side of the user interface continues to present information on some or all of the individual markers within the currently selected region (e.g., just the enumerated markers or the top ten markers regardless of enumeration). In the example illustrated, one of the description summaries corresponds to (e.g., matches) the currently selected marker and is therefore visually highlighted (e.g., shown enlarged and with a distinctive white boundary) within the user interface. The user interface may also omit an information box that presents aggregated information on the markers within the currently selected region of the map, for example, to avoid visually cluttering the user interface.

Figure 18:
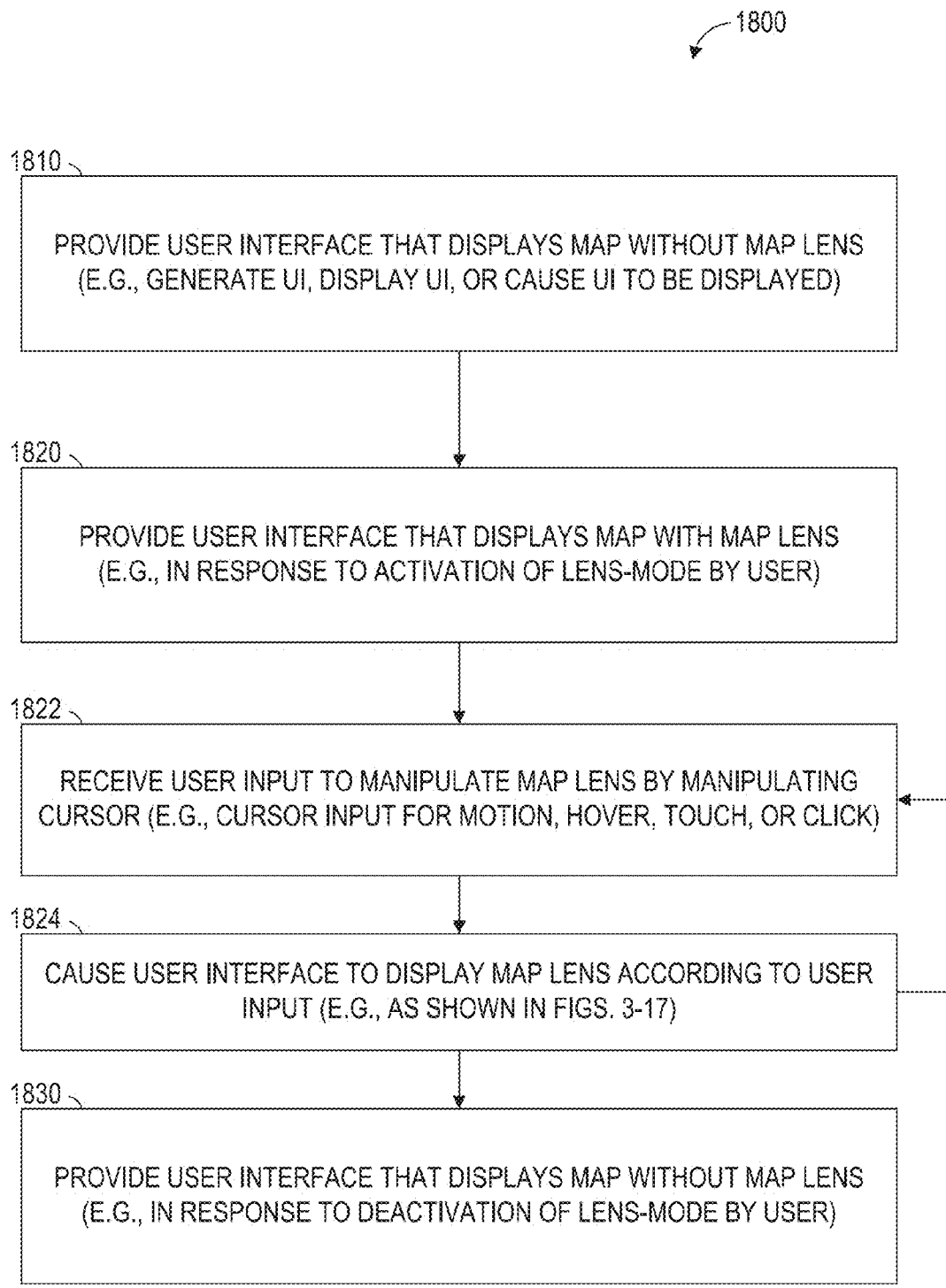
FIGS. 18-21 are flowcharts illustrating operations of the machine in providing the map lens in the user interface, according to some example embodiments.

FIGS. 18-21 are flowcharts illustrating operations of the machine 110 in performing a method 1800 of providing the map lens in the user interface, according to some example embodiments. Operations in the method 1800 may be performed using modules described above with respect to FIG. 2. As shown in FIG. 18, the method 1800 includes operations 1810, 1820, 1822, 1824, and 1830.

In operation 1810, the user interface module 210 provides the user interface without a map lens (e.g., as illustrated in FIG. 3). The user interface may display a map (e.g., geographical map), with or without one or more markers that indicate locations on the map. Provision (e.g., provisioning) of the user interface may include generating the user interface, displaying the user interface, or otherwise causing the user interface to be displayed (e.g., on the device 130 for presentation to the user 132).

In operation 1820, the user interface module 210 provides the user interface with a map lens (e.g., as illustrated in any of FIG. 4-17) superimposed (e.g., overlaid) on the map displayed in the user interface. The providing of the user interface with the map lens may be performed in response to activation of a "lens-mode" which initiates presentation of the map lens within the user interface. For example, the user interface module 210 may receive a user input (e.g., a click or touch on a toggle button within the user interface) that indicates a request to trigger the lens-mode and begin use of the map lens.

In operation 1822, the user interface module 210 receives a user input (e.g., cursor input) to manipulate the map lens around user interface (e.g., move the map lens over the map displayed in the user interface). For example, the received user input may specify movement (e.g., motion), non-movement (e.g., hover), activation (e.g., touch or click), or any suitable combination thereof, with respect to the user interface.

In operation 1824, the user interface module 210 causes the user interface to display the map lens according to the user input received in operation 1822. According to various example embodiments, the user interface module 210 causes the user interface to take on one or more appearances illustrated in one or more of FIGS. 3-17. Hence, operation 1824 may involve generating (e.g., regenerating) or updating the user interface provided in operation 1820. Operations 1822 and 1824 may be repeated (e.g., continuously) as the user interface module 210 monitors the user input (e.g., submitted by the user 132 from the device 130) and generates or updates the user interface in accordance with the monitored user input. Further details for operation 1824 are described below with respect to FIG. 19-21.

In operation 1830, the user interface module 210 provides the user interface without the map lens (e.g., as illustrated in FIG. 3). The user interface may continue to display the map, with or without one or more markers. The providing of the user interface without the map lens may be performed in response to deactivation of a "lens-mode" that initiated presentation of the map lens within the user interface. For example, the user interface module 210 may receive user input (e.g., a click or touch on a toggle button within the user interface) that indicates a request to cancel the lens-mode and cease use of the map lens.

Figure 19:
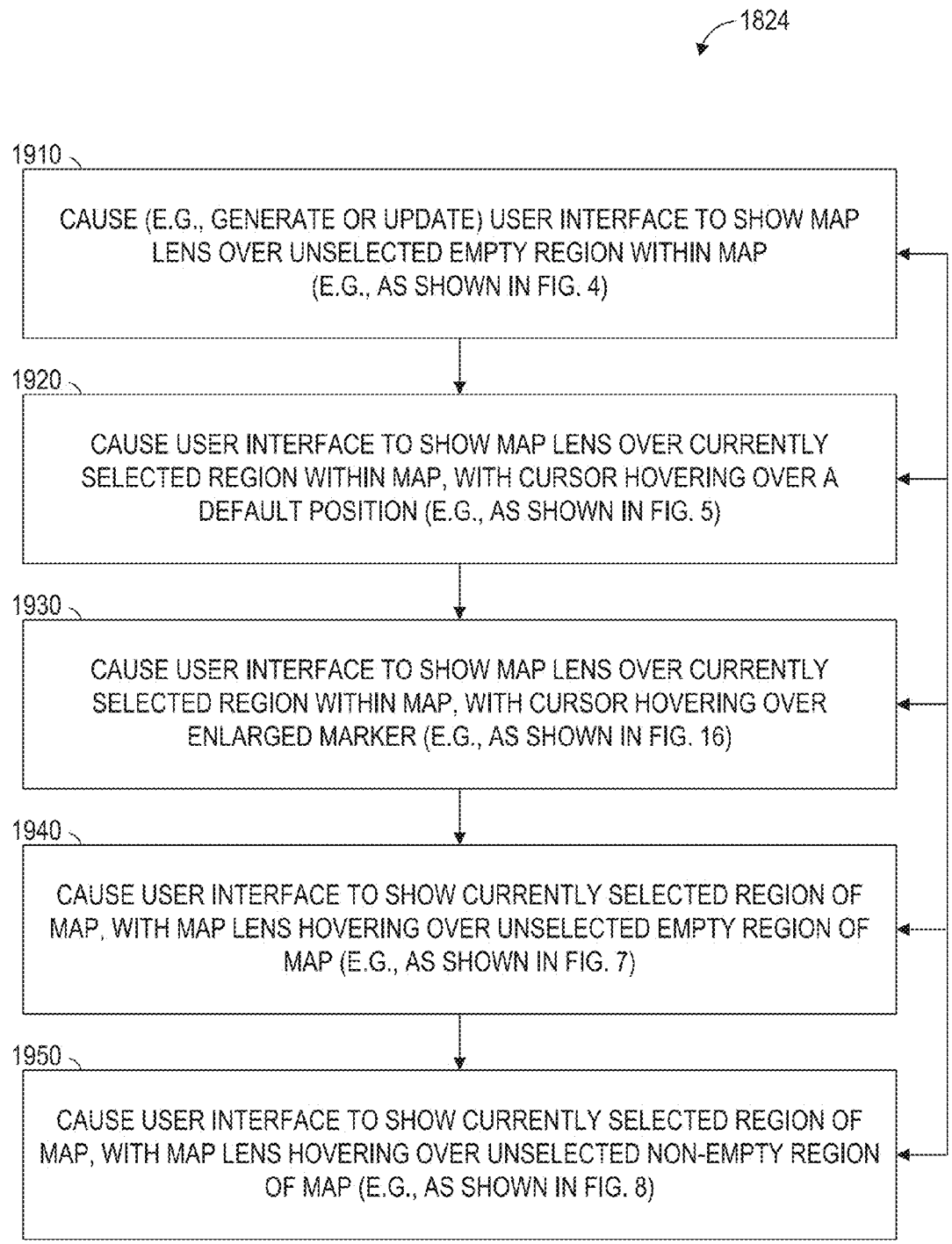

As shown in FIG. 19, one or more of operations 1910, 1920, 1930, 1940, and 1950 may be performed as part (e.g., a precursor task, a subroutine, or portion) of operation 1824. Any one or more of these operations 1910-1950 may be performed in response to some or all of the user input received in operation 1822.

In operation 1910, the user interface module 210 causes the user interface to show the map lens over an unselected empty region within the map. For example, the user interface module 210 may update, or otherwise cause, the user interface to take on the appearance illustrated in FIG. 4.

In operation 1920, the user interface module 210 causes the user interface to show the map lens over a currently selected region within the map, with a cursor hovering over a default position within the currently selected region. For example, the user interface module 210 may update, or otherwise cause, the user interface to take on the appearance illustrated in FIG. 5. This situation may arise where the user 132 has used a touch or a click to select the currently selected region (e.g., after moving the map lens to indicate this region on the map).

In operation 1930, the user interface module 210 causes the user interface to show the map lens over a currently selected region within the map, with a cursor (e.g., the same cursor from operation 1920) hovering over an enlarged marker within the currently selected region. For example, the user interface module 210 may update, or otherwise cause, the user interface to take on the appearance illustrated in FIG. 6. This situation may arise where the user 132 has moved the cursor over the marker, and the user interface has enlarged the marker in response to the cursor being moved over the marker.

In operation 1940, the user interface module 210 causes the user interface to show a currently selected region of the map, with the map lens hovering over a separate and unselected empty region of the map. The unselected empty region of the map may be a region that is bounded by the shape of the map lens and is devoid of any displayed markers. For example, the user interface module 210 may update, or otherwise cause, the user interface to take on the appearance illustrated in FIG. 7. This situation may arise where the user 132 has moved the cursor outside of the currently selected region of the map, and the user interface has replaced the cursor with a map lens (e.g., an additional map lens) to indicate that a different region of the map may be selected next (e.g., all while still displaying the currently selected region of the map).

In operation 1950, the user interface module 210 causes the user interface to show a currently selected region of the map, with the map lens hovering over a separate and unselected non-empty region of the map. The unselected non-empty region of the map may be a region that is bounded by the shape of the map lens and is populated by one or more displayed markers. For example, the user interface module 210 may update, or otherwise cause, the user interface to take on the appearance illustrated in FIG. 8.

Figure 20:
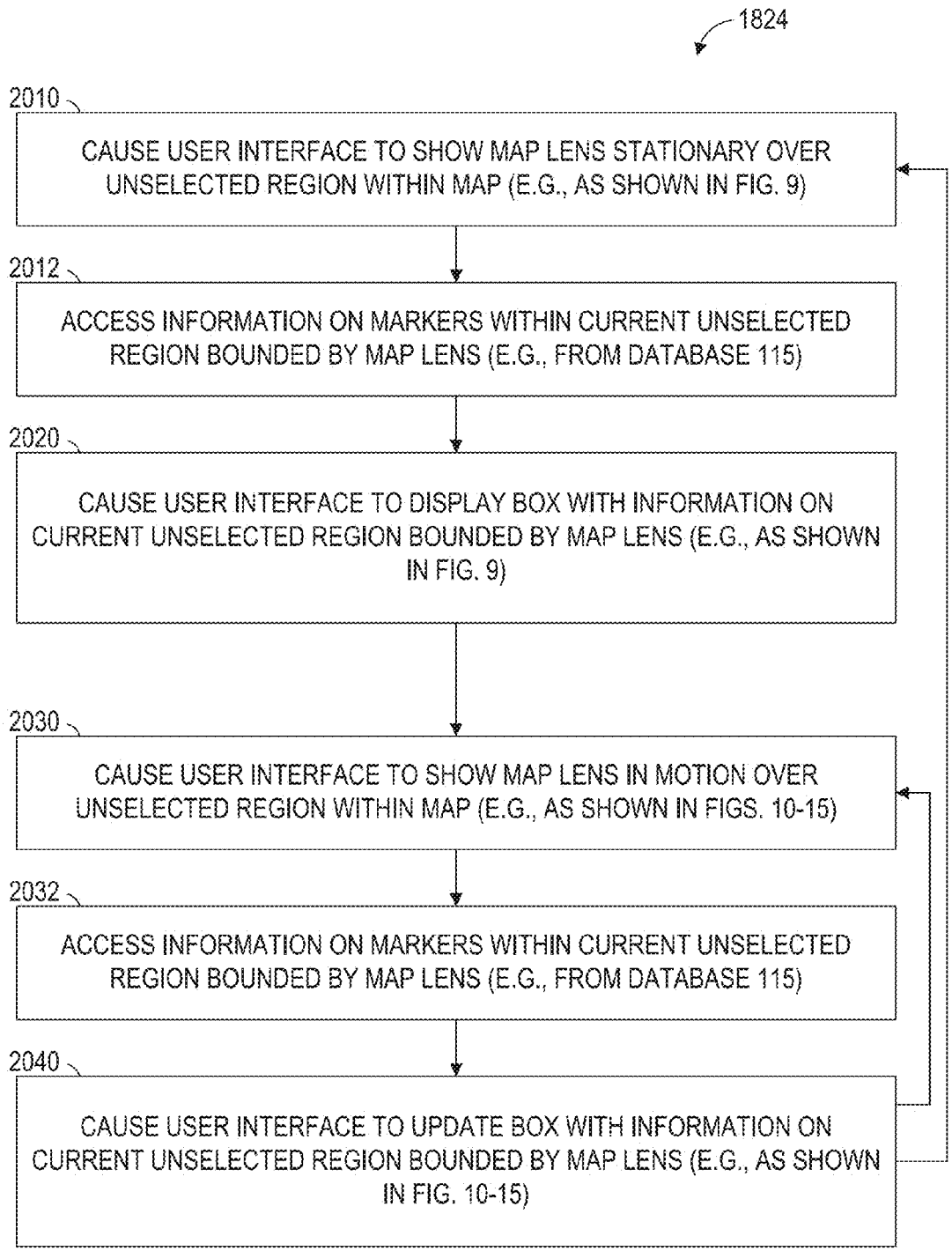

As shown in FIG. 20, one or more of operations 2010, 2012, 2020, 2030, 2032, and 2040 may be performed as part (e.g., a precursor task, a subroutine, or portion) of operation 1824. Any one or more of these operations 2010-2040 may be performed in response to some or all of the user input received in operation 1822.

In operation 2010, the user interface module 210 causes the user interface to show the map lens over an unselected region within the map (e.g., stationary and not moving with respect to the displayed map). In certain example embodiments, the map module 220 accesses the map (e.g., from the database 115) and provides all or part of the map to the user interface module 210 (e.g., for use in generating or updating the user interface), and the user interface module 210 performs operation 2010 based on the map provided by the map module 220. In various example embodiments, the marker module 230 accesses one or more markers (e.g., from the database 115) and provides them to the user interface module 210 (e.g., for use in generating or updating the user interface), and the user interface module 210 performs operation 2010 based on the one or more markers provided by the marker module 230. In hybrid example embodiments, both the map module 220 and the marker module 230 provide their respective contributions to the user interface module 210 during operation 2010 (e.g., for use in generating or updating the user interface). Markers (e.g., enumerated or non-enumerated) may be displayed within the unselected region (e.g., with a distinctive appearance), outside the unselected region (e.g., with the default appearance), or both. For example, the user interface module 210 may update, or otherwise cause, the user interface to show the map lens with the appearance illustrated in FIG. 9. This situation may arise in response to the user 132 initiating a lens-mode within the user interface (e.g., by activating a corresponding toggle switch provided by the user interface).

In operation 2012, the information module 240 accesses (e.g., reads, requests, retrieves, or obtains) information about one or more geographical locations identified by the one or more markers provided by the marker module 230, and the information module 240 may provide such information to the user interface module 210 (e.g., for use in generating or updating the user interface). Such information may be accessed from the database 115, or other suitable data repository (e.g., accessible via the network 190).

In operation 2020, the user interface module 210 causes the user interface to display a box (e.g., an information box or other suitable user interface element) that presents information on the current unselected region over which the map lens is shown. The box may present information about one or more markers shown in the unselected region. For example, the user interface module 210 may update, or otherwise cause, the user interface to present the box with the appearance illustrated in FIG. 9.

According to various example embodiments, as the user 132 causes the map lens to move across the displayed map, operations 2030, 2032, and 2040 may be performed in response to motion of the map lens under control of the user 132. In operation 2030, the user interface module 210 causes the user interface to show the map lens in motion (e.g., sliding or moving) over an unselected region within the map. In certain example embodiments, the map module 220 accesses the map (e.g., from the database 115) and provides all or part of the map to the user interface module 210 (e.g., for use in updating the user interface), and the user interface module 210 performs operation 2010 based on the map provided by the map module 220. In various example embodiments, the marker module 230 accesses one or more markers (e.g., from the database 115) and provides them to the user interface module 210 (e.g., for use in updating the user interface), and the user interface module 210 performs operation 2030 based on the one or more markers provided by the marker module 230. In hybrid example embodiments, both the map module 220 and the marker module 230 provide their respective contributions to the user interface module 210 during operation 2010 (e.g., for use in updating the user interface). Markers (e.g., enumerated or non-enumerated) may be displayed within the unselected region (e.g., with a distinctive appearance), outside the unselected region (e.g., with the default appearance), or both. For example, the user interface module 210 may update, or otherwise cause, the user interface to show the map lens with any of the appearances illustrated in FIGS. 10-15. This situation may arise in response to the user 132 initiating movement of the map lens within the user interface (e.g., by providing cursor input that indicates on-screen movement).

In operation 2032, the information module 240 accesses (e.g., reads, requests, retrieves, or obtains) information about one or more geographical locations identified by the one or more markers provided by the marker module 230, and the information module 240 may provide such information to the user interface module 210 (e.g., for use in updating the user interface). Such information may be accessed from the database 115, or other suitable data repository (e.g., accessible via the network 190).

In operation 2040, the user interface module 210 causes the user interface to update the box (e.g., the information box or other suitable user interface element) that presents information on the current unselected region over which the map lens is shown. The box may present updated information about one or more markers shown in the unselected region, which markers may themselves be updated according to movement of the map lens. For example, the user interface module 210 may update, or otherwise cause, the user interface to present the box with any of the appearances illustrated in FIGS. 10-15.

As shown in FIG. 20, operations 2030, 2032, and 2040 may be repeated (e.g., continuously) as the user interface module 210 monitors the user input (e.g., submitted by the user 132 from the device 130) and generates or updates the user interface in accordance with the monitored user input (e.g., specifying continuous motion of the map lens). Likewise, operations 2010, 2012, and 2020 may be repeated (e.g., intermittently) as the user interface module 210 monitors the user input and generates or updates the user interface in accordance with the monitored user input (e.g., specifying a stationary hover of the map lens).

Figure 21:
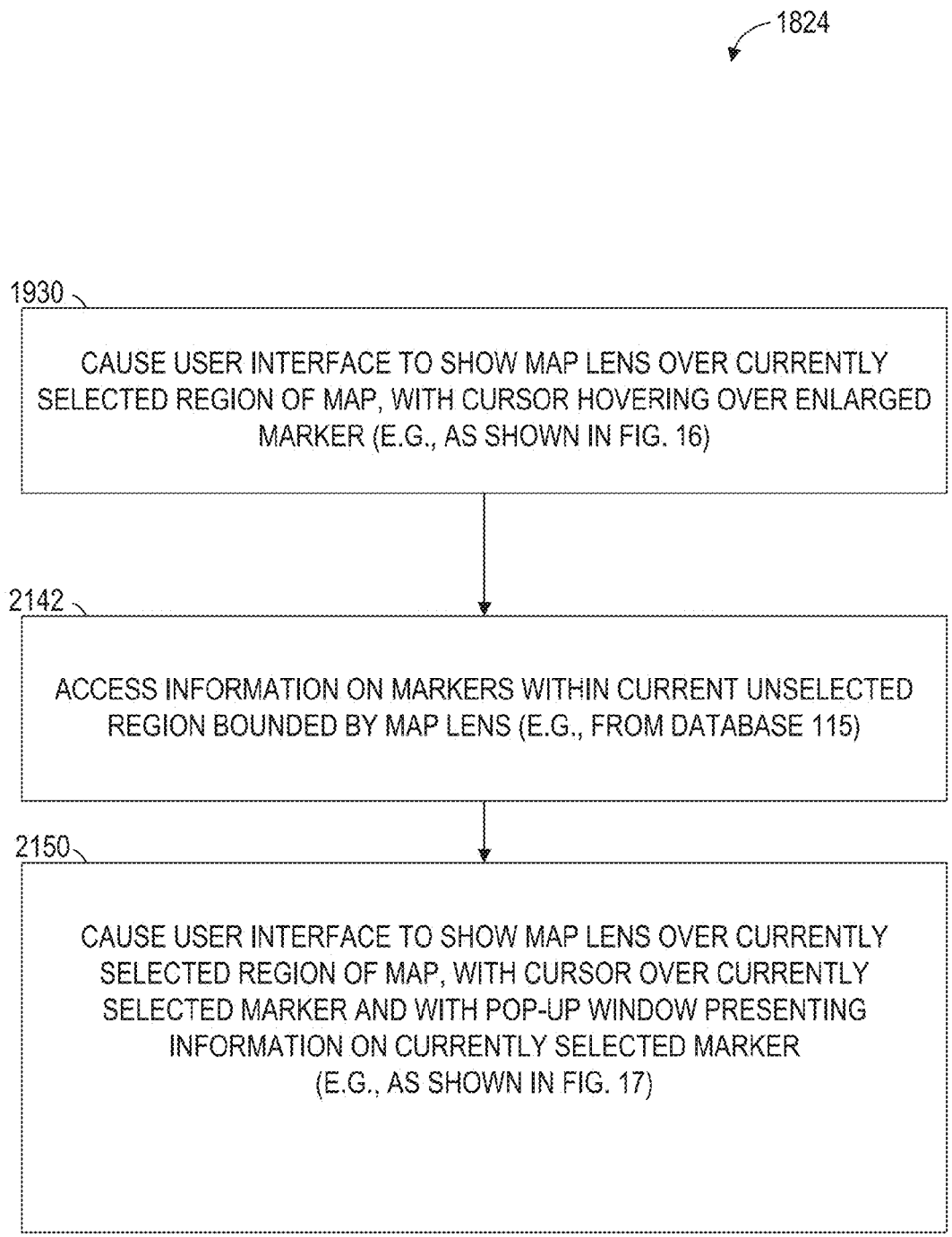

As shown in FIG. 21, one or more of operations 1930, 2142, and 2150 may be performed as part (e.g., a precursor task, a subroutine, or portion) of operation 1824. Any one or more of these operations 1930, 2142, and 2150 may be performed in response to some or all of the user input received in operation 1822.

In operation 1930, as noted above, the user interface module 210 causes the user interface to show the map lens over a currently selected region within the map, with a cursor (e.g., the same cursor from operation 1920) hovering over an enlarged marker within the currently selected region. For example, the user interface module 210 may update, or otherwise cause, the user interface to take on the appearance illustrated in FIG. 16.

In operation 2142, the information module 240 accesses (e.g., reads, requests, retrieves, or obtains) information about that geographical location identified by the enlarged marker, and the information module 240 may provide such information to the user interface module 210 (e.g., for use in generating or updating the user interface).

In operation 2150, the user interface module 210 causes the user interface to show the map lens over the currently selected region of the map, with the cursor hovering over the currently selected marker (e.g., the enlarged marker) within the currently selected region, and with a pop-up window that presents information on the currently selected marker. For example, the user interface module 210 may update, or otherwise cause, the user interface to take on the appearance illustrated in FIG. 17. This situation may arise where the user 132 has used a touch or a click to select the enumerated marker over which the cursor hovered in FIG. 16.

According to various example embodiments, one or more of the methodologies described herein may facilitate provision of the map lens within the user interface. Moreover, one or more of the methodologies described herein may facilitate presentation of a visually uncluttered map in which markers are only shown in the region in which the user 132 has expressed some interest, as indicated by the user 132 moving the map lens to that region of the map. Hence, one or more the methodologies described herein may facilitate provision of a user-friendly, visually intuitive, visually clean, easily learned, convenient, and efficient tool for discovering locations indicated by markers, as well as concentrations and placements thereof, within the map displayed in the user interface.

In addition, one or more the methodologies described herein may facilitate a presentation of only that information which is relevant to the markers in the region in which the user 132 has expressed some interest, as indicated by the user 132 moving the map lens to that region of the map. Accordingly, the presently described map lens and information box may support a user-friendly, visually intuitive, visually clean, easily learned, convenient, and efficient tool for filtering out undesired information and quickly finding information about locations within a particular region of the map.

When these effects are considered in aggregate, one or more of the methodologies described herein may obviate a need for certain efforts or resources that otherwise would be involved in provision of a map lens within a user interface. Efforts expended by a user in filtering out undesired information and quickly find the information about locations within a particular region of a map may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 22:
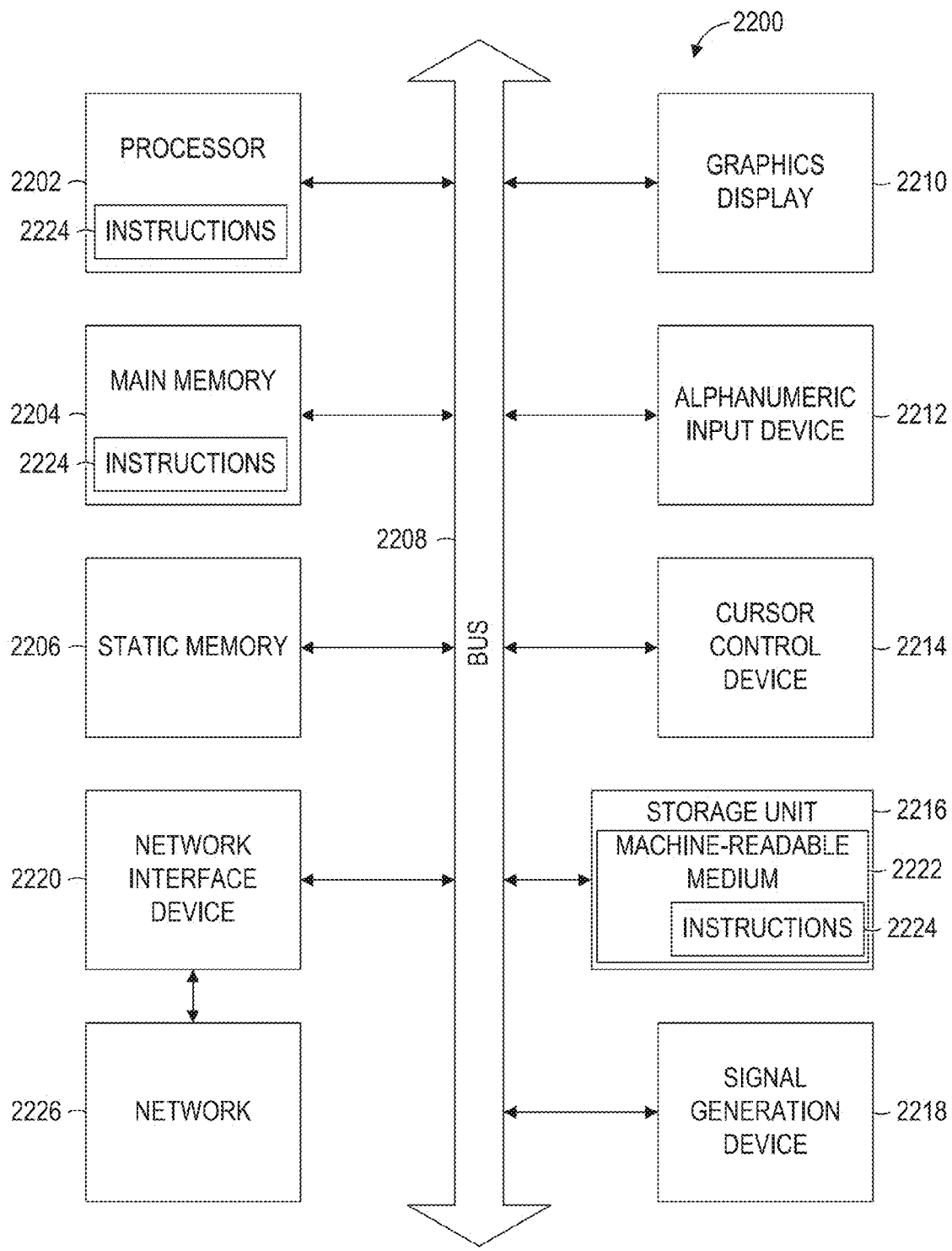
FIG. 22 is a block diagram illustrating components of a machine, according to some example embodiments, able to read instructions from a machine-readable medium and perform any one or more of the methodologies discussed herein.

FIG. 22 is a block diagram illustrating components of a machine 2200 (e.g., machine 110 or device 130), according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 22 shows a diagrammatic representation of the machine 2200 in the example form of a computer system and within which instructions 2224 (e.g., software, a program, an application, an applet, an app, or other executable code) for causing the machine 2200 to perform any one or more of the methodologies discussed herein may be executed, in whole or in part. In alternative embodiments, the machine 2200 operates as a standalone device or may be connected (e.g., networked) to other machines. In a networked deployment, the machine 2200 may operate in the capacity of a server machine or a client machine in a server-client network environment, or as a peer machine in a distributed (e.g., peer-to-peer) network environment. The machine 2200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 2224, sequentially or otherwise, that specify actions to be taken by that machine. Further, while only a single machine is illustrated, the term "machine" shall also be taken to include a collection of machines that individually or jointly execute the instructions 2224 to perform all or part of any one or more of the methodologies discussed herein.

The machine 2200 includes a processor 2202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 2204, and a static memory 2206, which are configured to communicate with each other via a bus 2208. The machine 2200 may further include a graphics display 2210 (e.g., a plasma display panel (PDP), a light emitting diode (LED) display, a liquid crystal display (LCD), a projector, or a cathode ray tube (CRT)). The machine 2200 may also include an alphanumeric input device 2212 (e.g., a keyboard), a cursor control device 2214 (e.g., a mouse, a touchpad, a trackball, a joystick, a motion sensor, or other pointing instrument), a storage unit 2216, a signal generation device 2218 (e.g., a speaker), and a network interface device 2220.

The storage unit 2216 includes a machine-readable medium 2222 on which is stored the instructions 2224 embodying any one or more of the methodologies or functions described herein. The instructions 2224 may also reside, completely or at least partially, within the main memory 2204, within the processor 2202 (e.g., within the processor's cache memory), or both, during execution thereof by the machine 2200. Accordingly, the main memory 2204 and the processor 2202 may be considered as machine-readable media. The instructions 2224 may be transmitted or received over a network 2226 (e.g., network 190) via the network interface device 2220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 2222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 2200), such that the instructions, when executed by one or more processors of the machine (e.g., processor 2202), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
providing a user interface that displays a map with a user-operable element that is superimposed on the map and has a shape defined by boundaries of the user-operable element;
receiving user input that indicates that a region of the map is selected, the selected region of the map being defined by the shape and the boundaries of the user-operable element superimposed on the map;
causing the user interface to display first location markers within the selected region defined by the shape and the boundaries of the user-operable element superimposed on the map in response to the user input that indicates that the region of the map is selected, the displayed first location markers appearing inside the boundaries of the user-operable element superimposed on the map, the causing of the user interface to display the location markers being performed by a processor of a machine;
receiving further user input to move the user-operable element away from selected region of the map, the moved user-operable element defining an unselected region of the map; and
causing the user interface to continue displaying the selected region of the map and the first location markers within the selected region while also displaying the unselected region of the map and second location markers within the unselected region, the unselected region being defined by the boundaries of the moved user-operable element and being colored differently from the selected region, the first location markers in the selected region being colored differently from the second location markers in the unselected region.

2. The method of claim 1, wherein:
the causing of the user interface to display the first location markers causes the first location markers to appear only within the shape and the boundaries of the user-operable element that is superimposed on the map.

3. The method of claim 1 further comprising:
causing the user interface to display a first location marker among the first location markers within the selected region as an enlarged location marker in response to a selection input that specifies the first location marker among the location markers.

4. The method of claim 1 further comprising:
prior to the receiving of the user input that indicates that the region is selected:
   accessing information about a geographical location identified by a first location marker displayed on the map within the boundaries of the user-operable element; and
   causing the user interface to display a graphical element that presents the information about the geographical location identified by the first location marker.

5. The method of claim 4, wherein:
the information about the geographical location is first information about a first geographical location; and the method further comprises:
prior to the receiving of the user input that indicates that the region is selected:
   receiving additional user input to move the user-operable element over a second location marker instead of the first location marker;
   accessing second information about a second geographic location identified by the second location marker; and
   causing the user interface to update the graphical element to present the second information about the second geographical location in response to the additional user input.

6. The method of claim 1, wherein:
the providing of the user interface includes determining the boundaries of the user-operable element based on a feature displayed in the map, the feature being selected from a group consisting of a landmark, a street, and a topographical indicator.

7. The method of claim 1, wherein:
the providing of the user interface includes determining a boundary among the boundaries of the user-operable element based on a feature displayed in the map, the feature being selected from a group consisting of a freeway, a coastline, a waterway, a city border, and a postal code border.

8. The method of claim 1, wherein:
the providing of the user interface includes determining a boundary among the boundaries of the user-operable element based on a feature displayed in the map, the feature being selected from a group consisting of a boulevard with at least a minimum number of lanes and a road with at least a minimum level of traffic.

9. The method of claim 1, wherein:
the map depicts a same geographical area during the receiving of the user input and during the causing of the user interface to display the first location markers; and the causing of the user interface to display the first location markers does not alter the same geographical area depicted by the map.

10. A non-transitory machine-readable storage medium comprising instructions that, when executed by one or more processors of a machine, cause the machine to perform operations comprising:
   providing a user interface that displays a map with a user-operable element that is superimposed on the map and has a shape defined by boundaries of the user-operable element;
   receiving user input that indicates that a region of the map is selected, the selected region of the map being defined by the shape and the boundaries of the user-operable element superimposed on the map;
   causing the user interface to display first location markers within the selected region defined by the shape and the boundaries of the user-operable element superimposed on the map in response to the user input that indicates that the region of the map is selected, the displayed first location markers appearing inside the boundaries of the user-operable element superimposed on the map;
   receiving further user input to move the user-operable element away from the selected region of the map, the moved user-operable element defining an unselected region of the map; and
   causing the user interface to continue displaying the selected region of the map and the first location markers within the selected region while also displaying the unselected region of the map and second location markers within the unselected region, the unselected region being defined by the boundaries of the moved user-operable element and being colored differently from the selected region, the first location markers in the selected region being colored differently from the second location markers in the unselected region.

11. A system comprising:
one or more processors;
a map module that configures at least one of the one or more processors to access a map from a database; and
a user interface module that configures at least one of the one or more processors to:
   provide a user interface that displays the map with a user-operable element that is superimposed on the map and has a shape defined by boundaries of the user-operable element;
   receive user input that indicates that a region of the map is selected, the selected region of the map being defined by the shape and the boundaries of the user-operable element superimposed on the map;
   cause the user interface to display first location markers within the selected region defined by the shape and the boundaries of the user-operable element superimposed on the map in response to the user input that indicates that the region of the map is selected, the displayed first location markers appearing inside the boundaries of the user-operable element superimposed on the map;
   receive further user input to move the user-operable element away from the selected region of the map; the moved user-operable element defining an unselected region of the map; and
   cause the user interface to continue displaying the selected region of the map and the first location markers within the selected region while also displaying the unselected region of the map and second location markers within the unselected region, the unselected region being defined by the boundaries of the moved user-operable element and being colored differently from the selected region, the first location markers in the selected region being colored differently from the second location markers in the unselected region.

* * * * *

UNITED STATES PATENT AND TRADEMARK OFFICE
CERTIFICATE OF CORRECTION

PATENT NO.        : 9,632,667 B2
APPLICATION NO.   : 14/223591
DATED             : April 25, 2017
INVENTOR(S)       : Huffman et al.

It is certified that error appears in the above-identified patent and that said Letters Patent is hereby corrected as shown below:

In the Claims

In Column 18, Line 59, in Claim 1, after "from", insert --the--

Signed and Sealed this
Seventeenth Day of April, 2018

Andrei Iancu
*Director of the United States Patent and Trademark Office*